(12) United States Patent
Kim et al.

(10) Patent No.: US 9,385,478 B2
(45) Date of Patent: Jul. 5, 2016

(54) HIGH-SPEED CONNECTOR INSERTS AND CABLES

(75) Inventors: Min Chul Kim, Santa Clara, CA (US); Paul Yuan, San Jose, CA (US); Josh Pong, San Jose, CA (US); Joseph Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1046 days.

(21) Appl. No.: 13/404,949

(22) Filed: Feb. 24, 2012

(65) Prior Publication Data

US 2012/0152613 A1 Jun. 21, 2012

Related U.S. Application Data

(63) Continuation of application No. 13/033,562, filed on Feb. 23, 2011, now Pat. No. 8,327,536.

(60) Provisional application No. 61/408,052, filed on Oct. 29, 2010, provisional application No. 61/360,432, filed on Jun. 30, 2010, provisional application No. 61/360,436, filed on Jun. 30, 2010.

(51) Int. Cl.
*H02G 15/08* (2006.01)
*H01R 13/6471* (2011.01)
(Continued)

(52) U.S. Cl.
CPC ........ *H01R 13/6471* (2013.01); *H01R 13/6592* (2013.01); *H01R 43/0249* (2013.01);
(Continued)

(58) Field of Classification Search
CPC .......... H01R 4/02; H01R 9/035; H01R 12/53; H01R 13/6592; H01R 13/6658; H01R 43/0249; H01R 2107/00; H01R 13/6463; H01R 13/6471; H01R 43/048

USPC .................. 439/607.41; 174/88 C
See application file for complete search history.

(56) References Cited

U.S. PATENT DOCUMENTS 3,581,143 A 5/1971 Dornfeld
4,628,151 A 12/1986 Cardas
(Continued)

FOREIGN PATENT DOCUMENTS

CN 1168549 A 12/1997
CN 1351356 A 5/2002
(Continued)

OTHER PUBLICATIONS

Non-Final Office Action for U.S. Appl. No. 12/239,742, mailed on Dec. 7, 2012, 10 pages.
(Continued)

*Primary Examiner* — Edwin A. Leon
(74) *Attorney, Agent, or Firm* — Kilpatrick, Townsend & Stockton LLP

(57) ABSTRACT

High speed connector inserts and cables having improved heat conduction, high strength, and may be manufactured in a reliable manner. One example may provide a connector insert having several paths by which heat may be removed from circuitry in the cable insert. In one example, heat may be removed from one or more circuits by forming a thermal path between a circuit and a shield of the connector insert. Another path may include one or more pads on a side of an integrated circuit board that are soldered directly to the shield. A braiding surrounding a cable may be soldered or otherwise thermally connected to the shield. Another example may provide a cable having a braiding that includes one or more types of fibers, such as aramid fibers. Another example may provide for increased manufacturability by using a wire comb and a solder bar.

20 Claims, 12 Drawing Sheets

(51) Int. Cl.
*H01R 13/6592* (2011.01)
*H01R 43/02* (2006.01)
*H01R 4/02* (2006.01)
*H01R 9/03* (2006.01)
*H01R 12/53* (2011.01)
*H01R 13/66* (2006.01)
*H01R 43/048* (2006.01)
*H01R 107/00* (2006.01)
*H01R 13/6463* (2011.01)

(52) U.S. Cl.
CPC .......... *H01R 4/02* (2013.01); *H01R 9/035* (2013.01); *H01R 12/53* (2013.01); *H01R 13/6463* (2013.01); *H01R 13/6658* (2013.01); *H01R 43/048* (2013.01); *H01R 2107/00* (2013.01); *Y10T 29/49174* (2015.01); *Y10T 29/49179* (2015.01); *Y10T 29/49181* (2015.01); *Y10T 29/49213* (2015.01)

(56) References Cited

U.S. PATENT DOCUMENTS

| | | |
|---|---|---|
| 5,228,035 A | 7/1993 | Hirato et al. |
| 5,313,465 A | 5/1994 | Perlman et al. |
| 5,711,686 A | 1/1998 | O'Sullivan et al. |
| 6,029,137 A | 2/2000 | Cordery et al. |
| 6,169,251 B1 | 1/2001 | Grant et al. |
| 6,485,335 B1 | 11/2002 | Dewdney |
| 6,495,763 B1 | 12/2002 | Eichmann et al. |
| 6,653,813 B2 | 11/2003 | Khatri |
| 6,677,534 B2 | 1/2004 | Yamamoto et al. |
| 6,792,474 B1 | 9/2004 | Hopprich et al. |
| 6,798,790 B1 | 9/2004 | Enssle et al. |
| 6,998,538 B1 | 2/2006 | Fetterolf, Sr. et al. |
| 7,033,219 B2 | 4/2006 | Gordon et al. |
| 7,174,413 B2 | 2/2007 | Pettey et al. |
| 7,188,209 B2 | 3/2007 | Pettey et al. |
| 7,197,549 B1 | 3/2007 | Salama et al. |
| 7,219,183 B2 | 5/2007 | Pettey et al. |
| 7,255,602 B1 | 8/2007 | Driessen et al. |
| 7,323,640 B2 | 1/2008 | Takahashi et al. |
| 7,366,182 B2 | 4/2008 | O'Neill |
| 7,369,388 B2 | 5/2008 | Cheung et al. |
| 7,422,471 B1 | 9/2008 | Wu |
| 7,447,922 B1 | 11/2008 | Asbury et al. |
| 7,466,712 B2 | 12/2008 | Makishima et al. |
| 7,480,303 B1 | 1/2009 | Ngai |
| 7,561,855 B2 | 7/2009 | Hofmeister et al. |
| 7,562,176 B2 | 7/2009 | Kloeppner et al. |
| 7,587,575 B2 | 9/2009 | Moertl et al. |
| 7,689,755 B2 | 3/2010 | Balasubramanian et al. |
| 7,743,197 B2 | 6/2010 | Chavan et al. |
| 7,830,882 B2 | 11/2010 | Johnson |
| 7,860,205 B1 | 12/2010 | Aweya et al. |
| 7,944,200 B2 | 5/2011 | Endo et al. |
| 8,267,718 B2 * | 9/2012 | Straka ............... H01R 9/034 439/497 |
| 8,312,302 B2 | 11/2012 | Baker et al. |
| 8,327,536 B2 | 12/2012 | Kim et al. |
| 8,380,912 B2 | 2/2013 | Jaramillo |
| 8,463,881 B1 | 6/2013 | Baker et al. |
| 8,516,238 B2 | 8/2013 | Cornelius et al. |
| 8,683,190 B2 | 3/2014 | Cornelius et al. |
| 8,696,378 B2 * | 4/2014 | Behziz ............. H01R 12/53 439/497 |
| 8,801,461 B2 * | 8/2014 | Kim ................. H01R 9/0515 439/581 |
| 8,862,912 B2 | 10/2014 | Baker et al. |
| 8,966,134 B2 | 2/2015 | Anderson |
| 8,976,799 B1 | 3/2015 | Baker et al. |
| 9,112,310 B2 | 8/2015 | Shahohian et al. |
| 2002/0010799 A1 | 1/2002 | Kubota et al. |
| 2002/0093935 A1 | 7/2002 | Denney et al. |
| 2003/0030720 A1 | 2/2003 | Hutchings |
| 2003/0137997 A1 | 7/2003 | Keating |
| 2004/0023645 A1 | 2/2004 | Olsen et al. |
| 2004/0080544 A1 | 4/2004 | Stripling |
| 2004/0115988 A1 | 6/2004 | Wu |
| 2004/0196682 A1 | 10/2004 | Funaba et al. |
| 2005/0044236 A1 | 2/2005 | Stafford |
| 2005/0060470 A1 | 3/2005 | Main et al. |
| 2005/0060480 A1 | 3/2005 | Solomon |
| 2005/0111362 A1 | 5/2005 | Freytsis et al. |
| 2005/0147119 A1 | 7/2005 | Tofano |
| 2005/0182876 A1 | 8/2005 | Kim et al. |
| 2005/0238035 A1 | 10/2005 | Riley |
| 2005/0262269 A1 | 11/2005 | Pike |
| 2005/0281193 A1 | 12/2005 | Hofmeister et al. |
| 2006/0023386 A1 | 2/2006 | Palinkas et al. |
| 2006/0029038 A1 | 2/2006 | Jungck |
| 2006/0083518 A1 | 4/2006 | Lee et al. |
| 2006/0092928 A1 | 5/2006 | Pike et al. |
| 2006/0168387 A1 | 7/2006 | Gan et al. |
| 2006/0200600 A1 | 9/2006 | Groso |
| 2006/0206655 A1 | 9/2006 | Chappell et al. |
| 2006/0288098 A1 | 12/2006 | Singh et al. |
| 2007/0011536 A1 | 1/2007 | Khanna et al. |
| 2007/0025481 A1 | 2/2007 | Ryu et al. |
| 2007/0067654 A1 | 3/2007 | Adachi |
| 2007/0074891 A1 | 4/2007 | Burke |
| 2007/0086487 A1 | 4/2007 | Yasuda et al. |
| 2007/0111597 A1 | 5/2007 | Kondou et al. |
| 2007/0174733 A1 | 7/2007 | Boyd et al. |
| 2007/0208899 A1 | 9/2007 | Freking et al. |
| 2007/0266179 A1 | 11/2007 | Chavan et al. |
| 2008/0079462 A1 | 4/2008 | Chiu et al. |
| 2008/0091857 A1 | 4/2008 | McDaniel |
| 2008/0117909 A1 | 5/2008 | Johnson |
| 2008/0123672 A1 | 5/2008 | Wilkinson |
| 2008/0147898 A1 | 6/2008 | Freimuth et al. |
| 2008/0172501 A1 | 7/2008 | Goodart et al. |
| 2008/0195747 A1 | 8/2008 | Elmaliah |
| 2008/0222338 A1 | 9/2008 | Balasubramanian |
| 2008/0250175 A1 | 10/2008 | Sheafor |
| 2008/0256445 A1 | 10/2008 | Olch et al. |
| 2008/0266730 A1 | 10/2008 | Viborg et al. |
| 2008/0279186 A1 | 11/2008 | Winter et al. |
| 2008/0318348 A1 | 12/2008 | Grupen-Shemansky |
| 2009/0003335 A1 | 1/2009 | Biran et al. |
| 2009/0003361 A1 | 1/2009 | Bakthavathsalam |
| 2009/0006710 A1 | 1/2009 | Daniel et al. |
| 2009/0016348 A1 | 1/2009 | Norden et al. |
| 2009/0022176 A1 | 1/2009 | Nguyen |
| 2009/0037606 A1 | 2/2009 | Diab |
| 2009/0063701 A1 | 3/2009 | Bagepalli et al. |
| 2009/0070775 A1 | 3/2009 | Riley |
| 2009/0117754 A1 | 5/2009 | Fields et al. |
| 2009/0182917 A1 | 7/2009 | Kim |
| 2009/0222924 A1 | 9/2009 | Droz et al. |
| 2009/0279473 A1 | 11/2009 | Lu et al. |
| 2009/0301755 A1 | 12/2009 | Shintani |
| 2010/0014598 A1 | 1/2010 | Pfeifer |
| 2010/0046590 A1 | 2/2010 | Harper et al. |
| 2010/0085091 A1 | 4/2010 | Strazzieri et al. |
| 2010/0185792 A1 | 7/2010 | Yao et al. |
| 2010/0303442 A1 | 12/2010 | Newton et al. |
| 2011/0019383 A1 | 1/2011 | Aoyama et al. |
| 2011/0167187 A1 | 7/2011 | Crumlin et al. |
| 2011/0256756 A1* | 10/2011 | Lu ............... H01B 7/0892 439/449 |
| 2011/0278043 A1 | 11/2011 | Ueda et al. |
| 2012/0000703 A1 | 1/2012 | Kim et al. |
| 2012/0000705 A1 | 1/2012 | Cornelius et al. |
| 2012/0005394 A1 | 1/2012 | Goodart et al. |
| 2012/0005496 A1 | 1/2012 | Baker |
| 2012/0103651 A1 | 5/2012 | Kim |
| 2012/0104543 A1 | 5/2012 | Shahoian |
| 2012/0106018 A1 | 5/2012 | Shahoian et al. |
| 2012/0182223 A1 | 7/2012 | Zeng et al. |
| 2012/0215950 A1 | 8/2012 | Anderson |
| 2012/0226774 A1 | 9/2012 | Hochsprung |
| 2012/0233489 A1 | 9/2012 | Cornelius et al. |
| 2013/0173936 A1 | 7/2013 | Baker et al. |

(56) References Cited

U.S. PATENT DOCUMENTS

| | | | | |
|---|---|---|---|---|
| 2014/0220822 | A1* | 8/2014 | Keyser | H01R 13/6595 439/607.46 |
| 2014/0344615 | A1 | 11/2014 | Cornelius et al. | |
| 2014/0359319 | A1 | 12/2014 | Baker et al. | |
| 2015/0212966 | A1 | 7/2015 | Anderson | |

FOREIGN PATENT DOCUMENTS

| | | | |
|---|---|---|---|
| CN | 101010833 | A | 8/2007 |
| CN | 101248559 | A | 8/2008 |
| CN | 201215850 | U | 4/2009 |
| CN | 201285827 | Y | 8/2009 |
| CN | 101803121 | A | 8/2010 |
| CN | 202678638 | U | 1/2013 |
| CN | 202797544 | U | 3/2013 |
| EP | 1202419 | A1 | 5/2002 |
| EP | 2090955 | A1 | 8/2009 |
| JP | 57-064083 | U | 4/1982 |
| JP | H05-41255 | A | 2/1993 |
| JP | H08-265600 | | 10/1996 |
| JP | H11-273790 | A | 10/1999 |
| JP | 2000-077141 | A | 3/2000 |
| JP | 2001-109697 | A | 4/2001 |
| JP | 2003-189263 | A | 7/2003 |
| JP | 2004-095518 | A | 3/2004 |
| JP | 2004-126885 | A | 4/2004 |
| JP | 2004-193090 | A | 7/2004 |
| JP | 2005-521368 | A | 7/2005 |
| JP | 2005-243446 | A | 9/2005 |
| JP | 2005-309744 | A | 11/2005 |
| JP | 2006-048594 | A | 2/2006 |
| JP | 2007-086876 | A | 4/2007 |
| JP | 2007-251779 | A | 9/2007 |
| JP | 2007-535235 | A | 11/2007 |
| JP | 2008-252310 | A | 10/2008 |
| JP | 2009-076375 | A | 4/2009 |
| JP | 2009-123561 | A | 6/2009 |
| KR | 20090079879 | A | 7/2009 |
| TW | 200303126 | A | 8/2003 |
| TW | 589563 | B | 6/2004 |
| TW | I239127 | B | 9/2005 |
| TW | 200627322 | A | 8/2006 |
| TW | 200838085 | A | 9/2008 |
| TW | 200909825 | A | 3/2009 |
| WO | 2006/102606 | A3 | 9/2006 |
| WO | WO 2006/102606 | A2 | 9/2006 |
| WO | 2007/099507 | A2 | 9/2007 |
| WO | 2009/039287 | A3 | 3/2009 |
| WO | WO 2009/039287 | A2 | 3/2009 |
| WO | 2009/046617 | A1 | 4/2009 |
| WO | 2009/086566 | A1 | 7/2009 |
| WO | 2010/051281 | A2 | 5/2010 |
| WO | 2010/051281 | A3 | 5/2010 |
| WO | 2012/003347 | A1 | 1/2012 |
| WO | 2012/003381 | A2 | 1/2012 |
| WO | 2012/003385 | A1 | 1/2012 |

OTHER PUBLICATIONS

Office Action for Japanese Patent Application No. 2012-543350, mailed on Dec. 28, 2012, in 4 pages.
Office Action for EP Application No. 11743164.3, mailed Aug. 1, 2014, 6 pages.
Notice of Allowance mailed on Jan. 13, 2015 for U.S. Appl. No. 12/239,742, 12 pages.
International Search Report and Written Opinion for Application No. PCT/US2011/042634, mailed on Nov. 30, 2011, 20 pages.
International Search Report and Written Opinion for Application No. PCT/US2011/042689, mailed on Sep. 28, 2011, 10 pages.
U.S. Appl. No. 12/895,842, filed Sep. 30, 2010, 21 pages.
U.S. Appl. No. 13/033,553, filed Feb. 23, 2011, 33 pages.
U.S. Appl. No. 13/173,739, filed Jun. 30, 2011, 27 pages.
U.S. Appl. No. 13/173,979, filed Jun. 30, 2011, 34 pages.
Non-Final Office Action mailed on Mar. 16, 2015 for U.S. Appl. No. 13/403,209, 35 pages.
Office Action for Taiwanese Patent Application No. 100123236, mailed on Feb. 19, 2014, with English translation, 4 pages.
Office Action for Taiwanese Patent Application No. 100123233, mailed on Feb. 19, 2014, with English translation, 7 pages.
Office Action for Taiwanese Patent Application No. 100123170, mailed on Feb. 20, 2014, 8 pages.
Office Action for Korean Patent Application No. 10-2012-7032475, mailed on Feb. 25, 2014, 6 pages.
Final Office Action for U.S. Appl. No. 13/033,553, mailed Mar. 10, 2014, 37 pages.
Office Action for Chinese Patent Application No. 201110189140.4, mailed on Mar. 28, 2014, 11 pages.
Notice of Allowance mailed on Apr. 13, 2015 for U.S. Appl. No. 13/033,542, 15 pages.
International Preliminary Report on Patentability for PCT Application No. PCT/US2011/042634, mailed on Jan. 8, 2013, 12 pages.
Non-Final Office Action for U.S. Appl. No. 13/480,345, mailed Apr. 1, 2013, 6 pages.
Non-Final Office Action for U.S. Appl. No. 13/615,642, mailed Apr. 12, 2013, 14 pages.
Notice of Allowance for U.S. Appl. No. 12/239,743, mailed Feb. 19, 2013, 48 pages.
Office Action for Korean Patent Application No. 10-2012-7032848, mailed on Apr. 30, 2014, 5 pages.
Notice of Allowance for U.S. Appl. No. 13/615,642, mailed Apr. 30, 2014, 5 pages.
Final Office Action mailed on May 23, 2014 for U.S. Appl. No. 13/403,209, 29 pages.
Display Port, Wikipedia, the free encyclopedia, 4 pages; printed on Aug. 29, 2008 from http://en.wikipedia.org/wiki/Displayport; page states it was last modified on Aug. 25, 2008.
Dopplinger, A., et al. "Using IEEE 1588 for synchronization of network-connected devices", Mar. 29, 2007, from www.embedded.com/columns/technicalinsights/, 7 pages.
Ethernet, Wikipedia, the free encyclopedia, 9 pages; printed on Aug. 17, 2008, from http://en.wikipedia.org/wiki/Ethernet; page states it was last modified on Aug. 17, 2008.
IDT 24-Lane 3-Port PCI Express, 89HPES24N3 Data Sheet, Jul. 18, 2006, 30 pages.
IEEE 1394 interface, Wikipedia, the free encyclopedia, 7 pages; printed on Jul. 24, 2008 from http://en.wikipedia.org/wiki/Firewire; page states it was last modified on Jul. 23, 2008.
PCI Express, Wikipedia, the free encyclopedia, 11 pages; printed on Jul. 24, 2008 from http://en.wikipedia.org/wiki/PCI-Express; page states it was last modified on Jul. 16, 2008.
PCI Express Architecture, Chapter 3, Address Spaces & Transaction Routing, from PCIEX.book, pp. 105-152, Aug. 5, 2003.
PCI Express Base Specification Revision 1.0a, Apr. 15, 2003, pp. 1-426.
PCI-X, Wikipedia, the free encyclopedia, 4 pages; printed on Sep. 9, 2008 from http://en.wikipedia.org/wiki/PCI-X; page states it was last modified on Sep. 4, 2008.
Peer-to-peer, Wikipedia, the free encyclopedia, 11 pages; printed on Jul. 24, 2008 from http://en.wikipedia.org/wiki/Peer-to-peer; page states it was last modified on Jul. 24, 2008.
Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.
Universal Serial Bus, Wikipedia, the free encyclopedia, 17 pages; printed on Jul. 24, 2008 from http://en.wikipedia.org/wiki/USB; page states it was last modified on Jul. 23, 2008.
VESA DisplayPort Standard, Version 1, Revision 1a, Jan. 11, 2008, 238 pages.
International Preliminary Report on Patentability for PCT Application No. PCT/US2011/042689, mailed on Jan. 17, 2013, 7 pages.
Chinese Office Action mailed on May 26, 2014 for CN Patent Application No. 201110189137.2, with English Translation, 10 pages.
Final Office Action for U.S. Appl. No. 13/403,182, mailed Jun. 11, 2014, 13 pages.

(56) References Cited

OTHER PUBLICATIONS

Office Action for Chinese Patent Application No. 201120235164.4, mailed on May 4, 2012, with English translation, 2 pages.
Notice of Allowance for Chinese Patent Application No. 201120235164.4, mailed on Sep. 17, 2012, with English translation, 4 pages.
Chinese Office Action mailed on Jun. 12, 2014 for CN Patent Application No. 201110189138.7, with English Translation, 7 pages.
Final Office Action for U.S. Appl. No. 12/239,742, mailed Jul. 8, 2014, 19 pages.
Taiwan Office Action mailed on Mar. 23, 2015 for TW Patent Application No. 100123170, with English translation, 9 pages.
Final Office Action mailed on Jun. 3, 2015 for U.S. Appl. No. 14/218,877, 7 pages.
Non-Final Office Action mailed on Jul. 6, 2015 for U.S. Appl. No. 14/629,358, 9 pages.
Notice of Allowance for U.S. Appl. No. 13/033,562, mailed on Aug. 8, 2012, 6 pages.
Japanese Office Action mailed on Jul. 27, 2015 for JP Patent Application No. 2013-110372, with English summary, 6 pages.
Non-Final Office Action mailed on Aug. 13, 2015 for U.S. Appl. No. 14/448,862, 10 pages.
Notice of Allowance for U.S. Appl. No. 13/173,739, mailed May 13, 2013, 29 pages.
Notice of Allowance for U.S. Appl. No. 13/173,979, mailed on Jul. 11, 2012, 5 pages.
International Preliminary Report on Patentability for PCT Application No. PCT/US2011/042684, mailed on Jan. 17, 2013, 12 pages.
Non-Final Office Action for U.S. Appl. No. 12/239,743 mailed on Jun. 21, 2012, 15 pages.
Office Action for European Patent Application No. 11743164.3, mailed Mar. 5, 2013, 2 pages.
Notice of Allowance for Japanese Patent Application No. 2012-543350, mailed on Mar. 12, 2013, in 3 pages.
Office Action for Japanese Patent Application No. 2012-541240, mailed on Oct. 26, 2012, 3 pages.
Notice of Allowance for Japanese Patent Application No. 2012-541240, mailed on Apr. 30, 2013, 3 pages.
Notice of Allowance for Chinese Patent Application No. 201120235144.7, mailed on Mar. 1, 2012, with English Translation, 4 pages.
Final Office Action mailed on Jul. 8, 2013 for U.S. Appl. No. 12/239,742, 14 pages.
Non-Final Office Action mailed on Jul. 9, 2013 for U.S. Appl. No. 13/033,542, 16 pages.
Non-Final Office Action mailed on Jul. 9, 2013 for U.S. Appl. No. 13/033,553, 17 pages.
Office Action for Chinese Patent Application No. 201110189140.4, mailed on Aug. 19, 2013, 11 pages.
Supplemental Notice of Allowance mailed on Aug. 26, 2014 for U.S. Appl. No. 13/615,642, 4 pages.
Final Office Action mailed on Oct. 16, 2014 for U.S. Appl. No. 13/033,542, 20 pages.
Notice of Allowance mailed on Oct. 17, 2014, for U.S. Appl. No. 13/403,182, 7 pages.
Non-Final Office Action mailed on Nov. 5, 2014 for U.S. Appl. No. 14/218,877, 4 pages.
Final Office Action mailed on Oct. 22, 2015 for U.S. Appl. No. 14/629,538, 16 pages.
Final Office Action mailed on Nov. 3, 2015 for U.S. Appl. No. 13/403,209, 35 pages.
Notice of Allowance mailed Oct. 22, 2015 for U.S. Appl. No. 14/218,877, 10 pages.
Japanese Notice of Allowance mailed on Aug. 5, 2013 for JP Patent Application No. 2012-547345, 3 pages.
Non-Final Office Action mailed on Sep. 9, 2013 for U.S. Appl. No. 13/249,260, 21 pages.
Chinese Office Action mailed on Sep. 18, 2013 for CN Patent Application No. 201110189137.2, with English Translation, 14 pages.
Chinese Office Action mailed on Sep. 24, 2013 for CN Patent Application No. 201110189138.7, with English Translation, 10 pages.
Non-Final Office Action mailed on Oct. 3, 2013 for U.S. Appl. No. 13/403,209, 18 pages.
Salvator, Dave; "Business Wire on Intel Announces Thunderbolt Technology,"; Feb. 24, 2013, 3 pages.
Pang, Tiffany; TI Introduces High-Performance, Dual-Mode DisplayPort Switches and DHMI/DVI Level Translations; Connects new PC Video Standard to Monitors and TVs; Mar. 11, 2008, 3 pages.
Texas Instruments; "DisplayPort Switch,"; Feb. 2008, 25 pages.
Texas Instruments; "DisplayPort Switch,"; Jan. 2008, revised Mar. 2008, 56 pages.
Final Office Action for U.S. Appl. No. 13/615,642, mailed Oct. 23, 2013, 11 pages.
Notice of Allowance for U.S. Appl. No. 13/480,345, mailed Oct. 30, 2013, 7 pages.
Office Action for Korean Patent Application No. 10-2012-7032488, mailed on Oct. 31, 2013, with English translation, 6 pages.
Non-Final Office Action for U.S. Appl. No. 13/403,182, mailed Dec. 20, 2013, 14 pages.
Taiwan Office Action mailed on Dec. 2, 2015 for TW Patent Application No. 100123170, with English translation, 3 pages.
Final Office Action mailed Mar. 31, 2016, for U.S. Appl. No. 14/448,862, 7 pages.

* cited by examiner

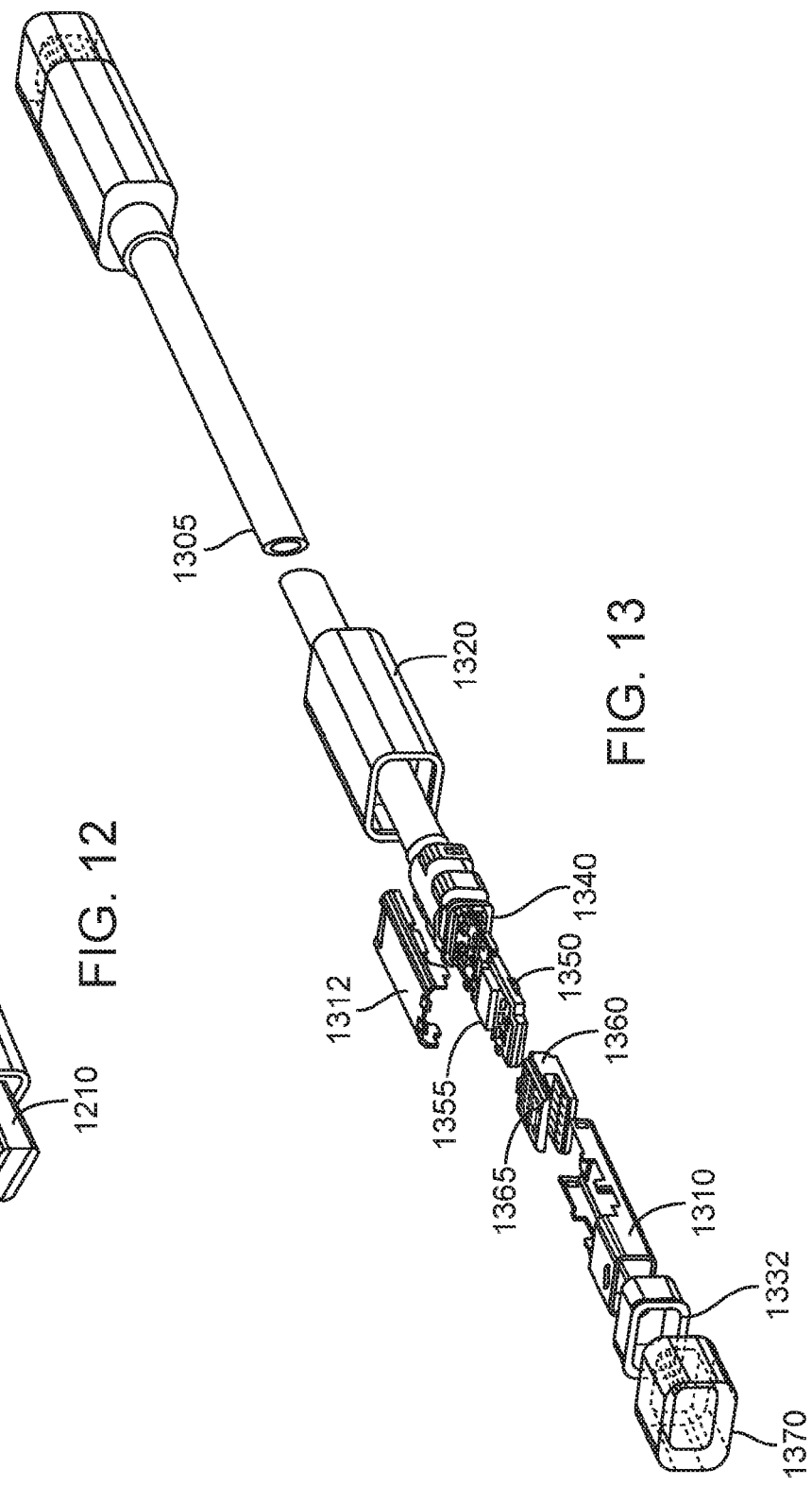

HIGH-SPEED CONNECTOR INSERTS AND CABLES

CROSS-REFERENCES TO RELATED APPLICATIONS

This application is a continuation of U.S. application Ser. No. 13/033,562, filed Feb. 23, 2011; which claims the benefit of U.S. provisional patent applications Nos. 61/360,436, filed Jun. 30, 2010, 61/360,432, filed Jun. 30, 2010, and 61/408,052, filed Oct. 29, 2010, and is related to U.S. applications Ser. Nos. 12/895,842, filed Sep. 30, 2010, and 13/033,553, filed Feb. 23, 2011, which are incorporated by reference.

BACKGROUND

The amount of data transferred between and among electronic devices has increased tremendously. Applications such as high-definition video require huge amounts of data to be transferred at very high data rates. Unfortunately, high-speed communications between electronic devices have become so fast that simple cables consisting of two inserts connected by wires are no longer suitable. These simple cables degrade signals and cause skews such that high-speed data communication is not reliable.

Accordingly, new cables are needed. These cables may be active in that they include active electronic components, such as integrated circuits. These circuits consume power and thus create heat. This heat can degrade reliability of the cable and its circuitry, and can also be unpleasant for a user to touch.

These cables may experience forces and mechanical stress during use. Given their complexity, it may be useful to provide cables having increased strength. Also, given their complexity, problems with manufacturability may be a concern.

Thus, what is needed are circuits, methods, and apparatus for high-speed cables that can reliably convey signals in high-speed communications. The cable inserts may be able to transfer heat in a way to improve user experience and cable reliability. The cables may have increased strength. The cables and connector inserts may be arranged in such a way as to provide improved manufacturability.

SUMMARY

Accordingly, embodiments of the present invention may provide high speed connector inserts and cables having improved heat conduction, high strength, and may be manufactured in a reliable manner.

An exemplary embodiment of the present invention may provide a connector insert having improved heat conduction. This connector insert may include several paths by which heat may be removed from circuitry in the cable insert. In one example, heat may be removed from one or more circuits by forming a thermal path between the circuit, which may be an integrated circuit or other device, and a shield of the connector insert. This path may include a thermally conductive material to further reduce its thermal resistance. Another example may include one or more pads on a side of an integrated circuit board. These pads may be soldered directly to the shield, or otherwise thermally connected to the shield.

To improve heat conduction in another example, braiding surrounding a cable may be soldered or otherwise thermally connected to the shield. This connection may be covered by a cap to avoid electromagnet interference (EMI) leakage. This cap may be crimped to provide a robust mechanical connection. This crimping may be accomplished by applying force to the cap in multiple directions. In one specific embodiment of the present invention, force may be applied to the cap in four directions during crimping. The cap may be soldered to portions of either or both the connector insert and cable for improved heat conduction and mechanical reliability.

Another exemplary embodiment of the present invention may provide a cable having a high strength. To provide this increased strength, a braiding surrounding the cable or one or more of its conductors may include one or more types of fibers. For example, aramid fibers may be included in the braiding around the cable. To simplify soldering of the braiding, the aramid or other fibers may be bunched or grouped, such that they may be pulled out of the way. In various embodiments of the present invention, these fibers may be pulled out of the way using static electricity, or by other mechanisms. A specific embodiment of the present invention may use a braiding formed of counter-rotating spirals to assist in the separation of the aramid fibers.

Another exemplary embodiment of the present invention may provide for a reliable manufacturability. One specific example may align several pairs of twisted pairs of conductors in the cable using a wire comb. Specifically, a wire comb having a plurality of openings may be used to hold twisted pairs in an aligned manner. This may allow soldering of the cables to a printed circuit board or other appropriate substrate. In various embodiments of the present invention, this soldering may be accomplished in a reliable manner using a solder bar.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 12 illustrates a connector insert according to an embodiment of the present invention; and FIG. 13 illustrates an exploded view of a connector insert according to an embodiment of the present invention.

DESCRIPTION OF EXEMPLARY EMBODIMENTS

Figure 1:
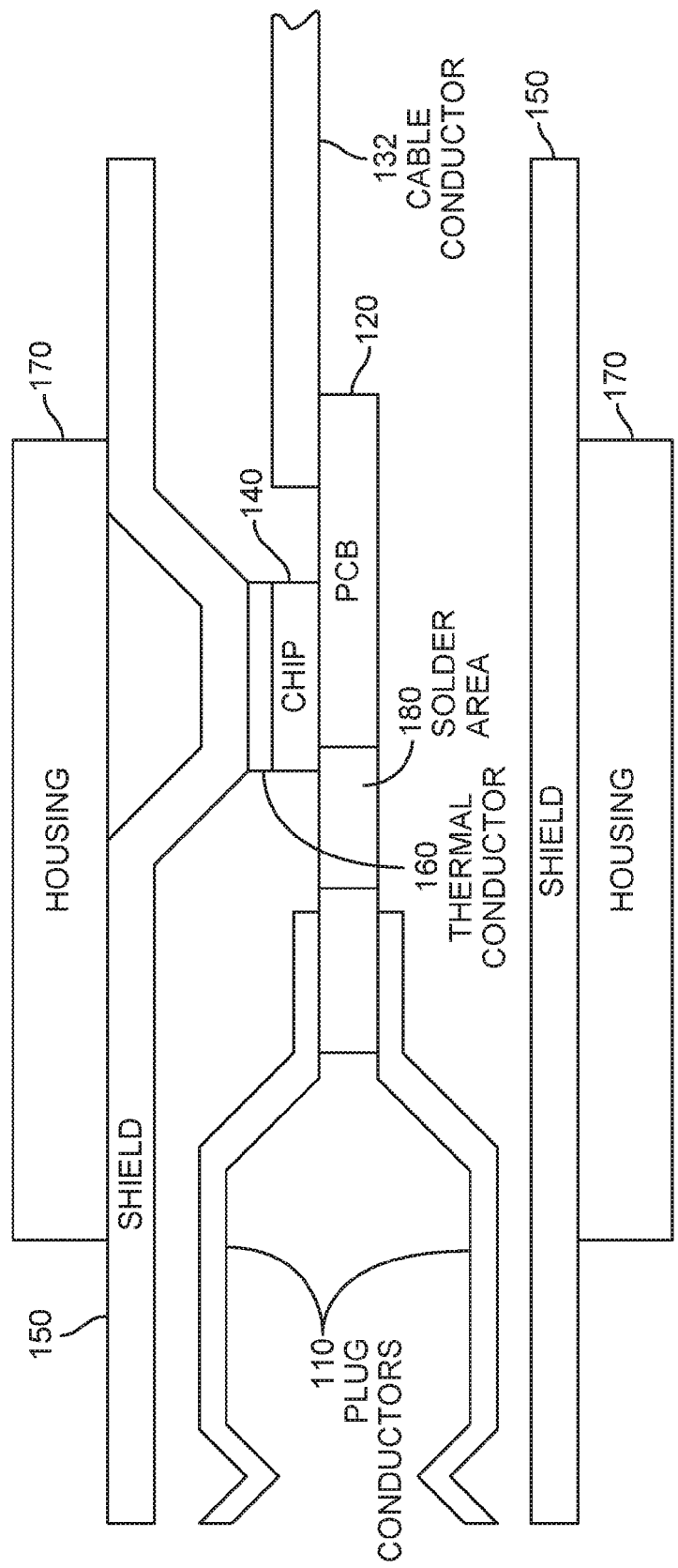
FIG. 1 illustrates a connector plug according to an embodiment of the present invention.

FIG. 1 illustrates a side view of a connector plug according to an embodiment of the present invention. This figure, as with the other included figures, is shown for illustrative purposes and does not limit either the possible embodiments of the present invention or the claims.

Again, this plug may be part of an active cable for high-speed data communications. As such, it may include active circuitry, such as chip 140, which consumes power and generates heat. This heat can reduce the reliability of the active circuitry and make for an unpleasant user experience if it becomes excessively hot. Thus, it is desirable to remove heat from this connector plug. Accordingly, embodiments of the present invention may provide several low thermal resistance paths to dissipate this heat.

This connector plug includes plug connectors 110, which may mate with conductors of a connector receptacle (not shown). Plug connectors 110 may mechanically attach to printed circuit board 120. These plug connectors 110 may electrically connect to chip 140 using traces on printed circuit board 120. Plug connectors and chip 140 may connect to wires and cable 130 via traces on printed circuit board 120. Housing 170 may be used to surround shield 150.

Chip 140 may be an example circuit of many circuits that may generate the majority of heat in this plug. Again, embodiments of the present invention may employ several paths by which heat can be dissipated. In the first, heat can be removed from chip 140 directly to shield 150. Accordingly, a thermal conductor layer 160 may be used to provide a thermal path from chip 140 to shield 150. In a second path, chip 140 may attach to printed circuit board 120, thereby allowing heat to flow into printed circuit board 120. A solder area 180, which may be on the side, bottom, or top of printed circuit board 120, may be soldered to a portion of shield 150, thereby creating a low thermal resistance path from the printed circuit board to the shield for heat dissipation. From the shield, head can dissipate out through the cable. In a specific embodiment of the present invention, a side of the printed circuit board 120 is plated and soldered to the shield. The heat thus travels from the chip to the printed circuit board, then to the shield via the edge plating, then to the cable via cable braiding.

In a third path, the cable (not shown) also provides a path for heat to leave this plug. As will be seen below, a braiding or other layer of the cable may be soldered or otherwise attached to shield 150. This may allow head to dissipate through the cable. In other embodiments of the present invention, a low thermal path, which may include liquid, metal, or other material, may be included in the cable.

Plug conductors 110 may also provide a heat path into a device receptacle. The device receptacle may be designed to provide low thermal resistance paths to further aid in the dissipation of heat in the plug.

Again, much of the heat generated by active circuitry in the connector insert can be removed via conduction through the cable. An example of how this is done is shown in the following figures.

Figure 2:
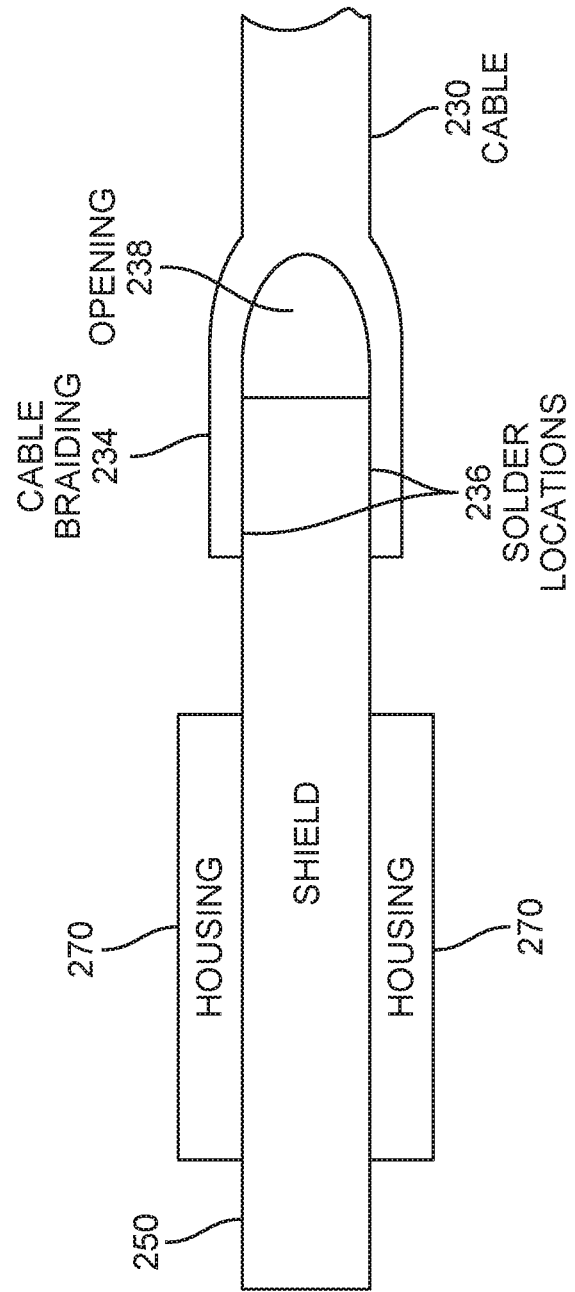
FIG. 2 illustrates a side view of a connection between a cable and a connector insert shield.

FIG. 2 illustrates a side view of a connection between cable 230 and connector insert shield 250. Cable braiding 234 may be pulled away from cable 230 and soldered to shield 250 at solder locations 236. Conductors (not shown) in cable 230 may connect to circuitry inside shield 250. Housing 270 may surround portion of shield 250 to provide thermal insulation and the location for a user to grasp the connector insert.

As cable braiding 234 is separated from cable 230, one or more openings 238 may form. For example, shield 250 may have a width greater than its height. Some or all of cable braiding 234 may attach to shield 250 along the width of shield 250, thereby leaving opening 238 along the height (or side) of shield 250. Opening 238 may provide a path for electromagnetic interference to be emitted from the cable conductors (not shown). Accordingly, embodiments of the present invention may employ a cap or other structure over the opening 238. An example is shown in the following figure.

Figure 3:
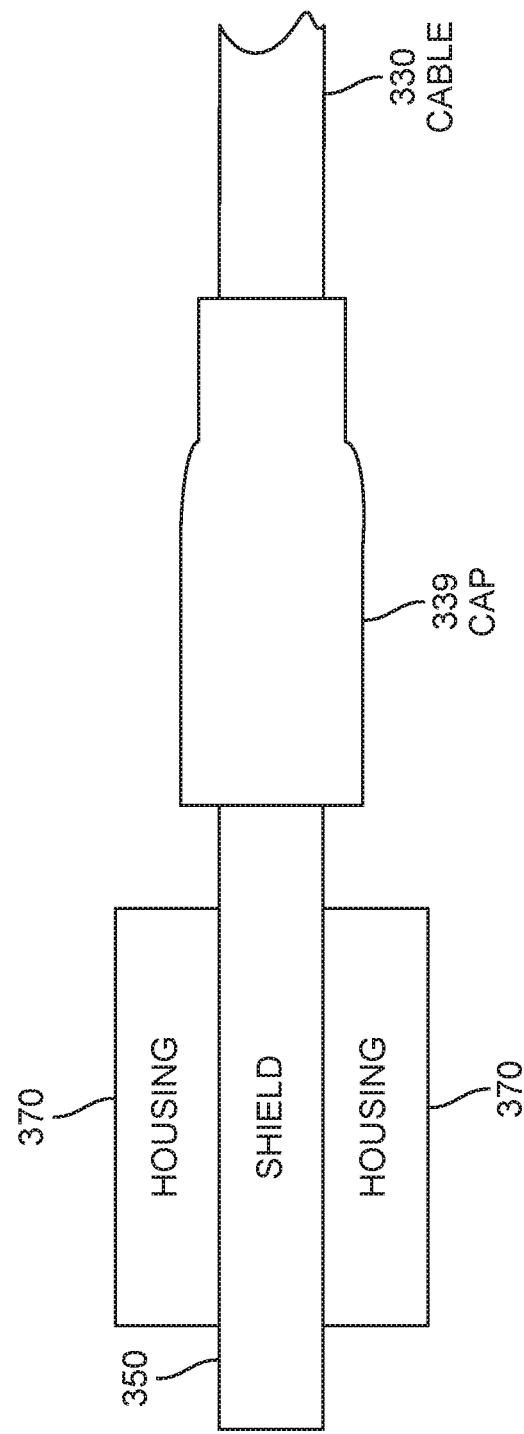
FIG. 3 illustrates a cap that may be located over solder locations joining a cable braiding and connector insert shield.

FIG. 3 illustrates a cap 339 that may be located over solder locations 236 between a cable braiding 234 and connector insert shield 250 consistent with embodiments of the present invention. Cap 339 may be formed of metal such as aluminum, stainless steel, or other material. During manufacturing, cap 339 may be placed over solder locations 236 and crimped to be held in place. Cap 339 may also be soldered to provide additional shielding and mechanical support.

Conventional techniques used to crimp caps, such as cap 339, often smash the cap and distort it, thereby possibly damaging the cable. Accordingly, embodiments of the present invention may crimp cap 339 by applying forces in multiple directions. An example is shown in the following figure.

Figure 4:
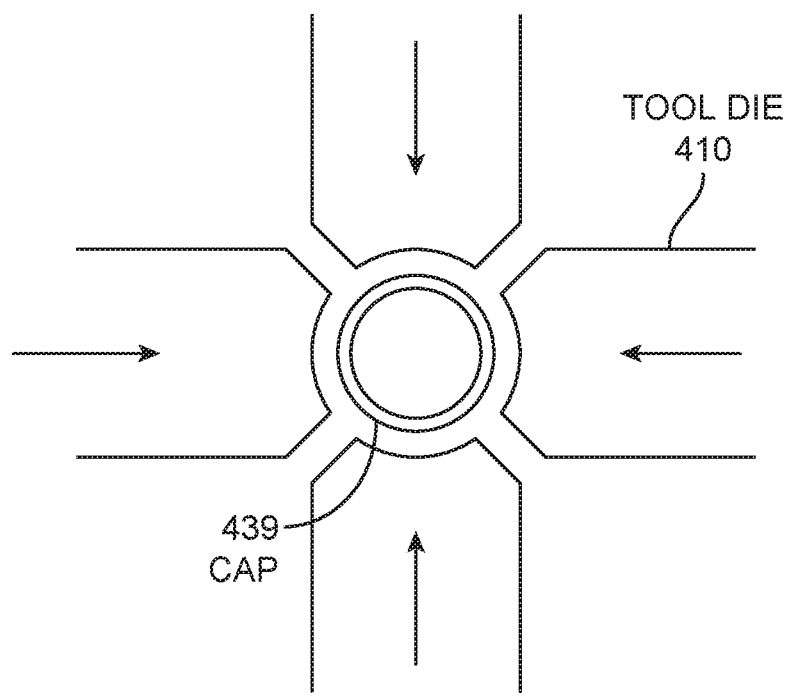
FIG. 4 illustrates a crimping technique that may be employed by embodiments of the present invention.

FIG. 4 illustrates a crimping technique employed by various embodiments of the present invention. In this particular example, force is applied in four directions by tool die 410 on cap 439. These forces may crimp cap 439 in a highly symmetrical manner for improved yield, improved EMI isolation, and mechanical stability. Also, this technique may reduce asymmetric forces that cable 330 would otherwise experience, thereby reducing the chance of damage to interior conductors (not shown) in cable 330 during manufacturing.

In this particular embodiment of the present invention, force may be applied to cap 439 in four directions, though in other embodiments of the present invention, force may be applied in other numbers of directions, such as two, three, or more than four directions.

Again, embodiments of the present invention may provide a cable having a high strength. To provide this increased strength, a shield or braiding surrounding the cable or one or more of its conductors may include one or more types of fibers. For example, aramid fibers may be included in a shield or braiding around the cable. Unfortunately, aramid fibers may interfere with the soldering process outlined above. To simply soldering of the braiding, the aramid or other fibers may be bunched or grouped in the cable shield or braiding, such that they may be pulled out of the way during soldering. In various embodiments of the present invention, these fibers may be pulled out of the way using static electricity, or by other mechanisms. An example of such a cable is shown in the following figure.

Figure 5:
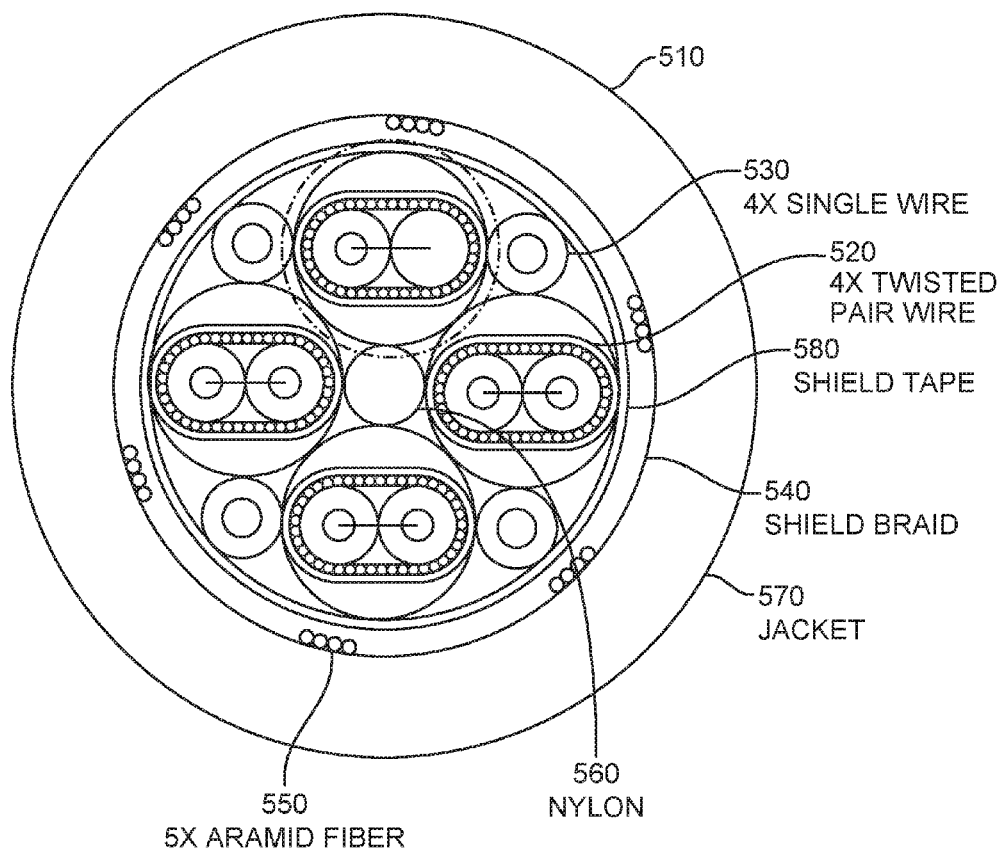
FIG. 5 is a cross-section of a high-speed cable according to an embodiment of the present invention.

FIG. 5 is a cross-section of a high-speed cable according to an embodiment of the present invention. This cable may include four twisted pairs 520 and four single wires 530. Twisted pairs 520 may be used to carry differential signals, multiple single ended signals, power, ground, bias, control, status, or other types of signal, power, status, or control lines. Single wires 530 may be used to convey single ended signals, one side of a differential signal, power, ground, bias control, status, or other types of signal, power, status, or control lines. In other embodiments the present invention, cables consistent with embodiments of the present invention may include other numbers of twisted pairs and single wires.

In this example, twisted-pairs 520 and single wires 530 surround a nylon core 560, which is used for mechanical support. In other embodiments of the present invention, nylon core 560 may be substituted by a wire, one or more fiber-optic lines, or other conductor or fiber. These connectors may be bound by shield tape 580.

Shield braid 540 may surround the cable. Jacket 570 may surround shield braid 540 and provide mechanical support for the cable. Again, aramid fibers 550 may be dispersed or grouped in shield braid 540. Shield braid 540 may be a conventional interwoven braiding, shield braid 540 may be formed of one or more counter-rotating spirals, or shield braiding 540 may be formed in other various ways.

Figure 6:
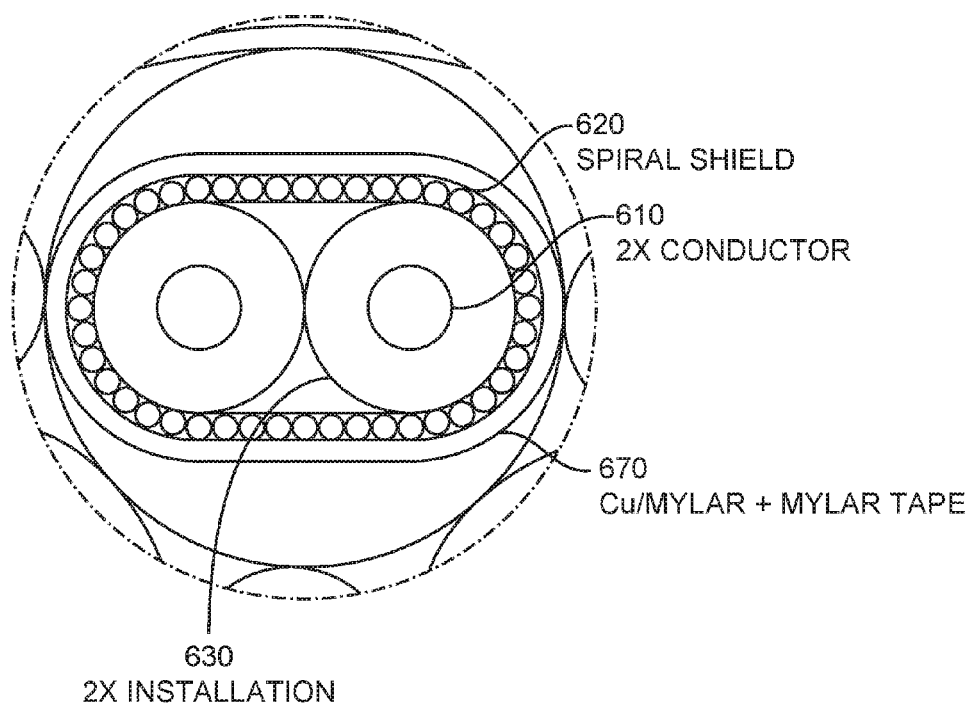
FIG. 6 is a more detailed view of a twisted pair according to an embodiment of the present invention.

FIG. 6 is a more detailed view of twisted pair 520 according to an embodiment of the present invention. Twisted pairs 520 may include two conductors 610 surrounded by insulation layer 630. Spiral shield 620 may surround twisted-pair 520 and provides shielding against electromagnetic interference. Spiral shield 620, like shield braid 540, may be formed of braiding, one or more counter-rotating spirals, or other ways. Copper Mylar tape layer 670 may bind and provide mechanical support for spiral shield 620 and conductors 610.

Again, embodiments of the present invention may employ one, two, or more counter-rotating spirals as a shield. An example is shown in the following figure.

Figure 7:
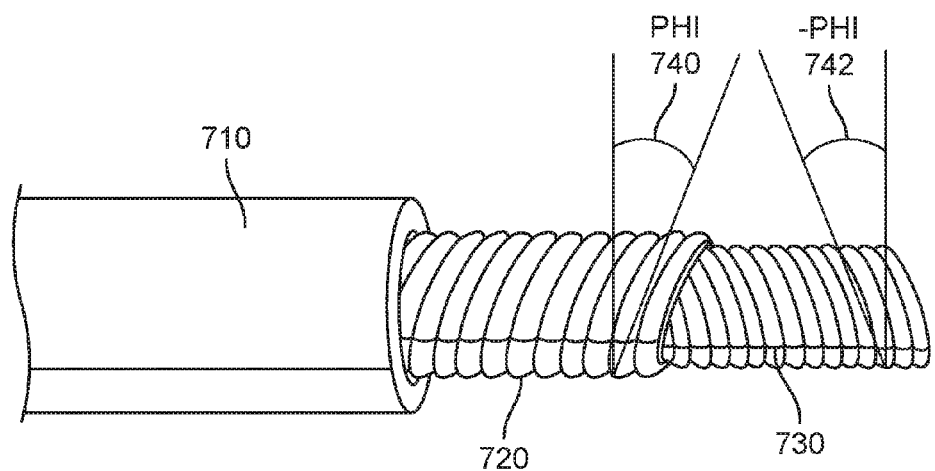
FIG. 7 illustrates a side view of a portion of the cable according to an embodiment of the present invention.

FIG. 7 illustrates a side view of a portion of the cable according to an embodiment of the present invention. This figure illustrates a cable surrounded by jacket 710. Jacket 710 has been cut away to reveal a first counter-rotating spiral 720 and a second counter-rotating spiral 730. The first of these spirals may have an angle approximately equal to phi 740. In a specific embodiment of the present invention, phi may be equal to 17 degrees. In other embodiments of the present invention, other angles may be used. The second of these may have approximately the same relative angle, shown here as negative phi 742 to indicate a different absolute direction.

In this way, during manufacturing, the wires in the counter-rotating spirals 720 and 730 may be easily peeled away, straightened, and soldered or otherwise electrically connected to locations in a connector plug.

Utilizing counter-rotating spirals 720 and 730 may also improve flexibility of the cable. For example, when the cable is twisted in a first direction, counter-rotating spiral 720 may tighten while counter-rotating spiral 730 may loosen. The tightening of counter-rotating spiral 720 may protect the internal conductors. Similarly, when the cable is twisted in a second direction, counter-rotating spiral 730 may tighten while counter-rotating spiral 720 may loosen. The tightening of counter-rotating spirals 730 may protect the internal conductors.

Again, one or more different types of fibers may be employed by embodiments of the present invention. These fibers may be interspersed singly or in groups in one or more of the counter-rotating spirals 720 and 730. These fibers may be included for various reasons.

In a specific embodiment of the present invention, aramid fibers may be included for additional strength. Again, aramid fibers may interfere with soldering of the counter-rotating spirals 720 and 730 to locations such as a shield of, or pads in, a connector insert. Accordingly, in various embodiments of the present invention, these fibers may be pulled away from the wires in the counter-rotating spirals 720 and 730 by static electricity, air movement, or other methods.

The cable shown here may be made in a number of ways. In one, the wires and twisted pairs are pulled from spools and then wrapped in various layers for mechanical support. To improve reliability of the cable and reduce the chance of damage when the cable is used, the spools holding the wires and twisted pairs may be rotated during cable manufacturing. An example is shown in the following figure.

Figure 8:
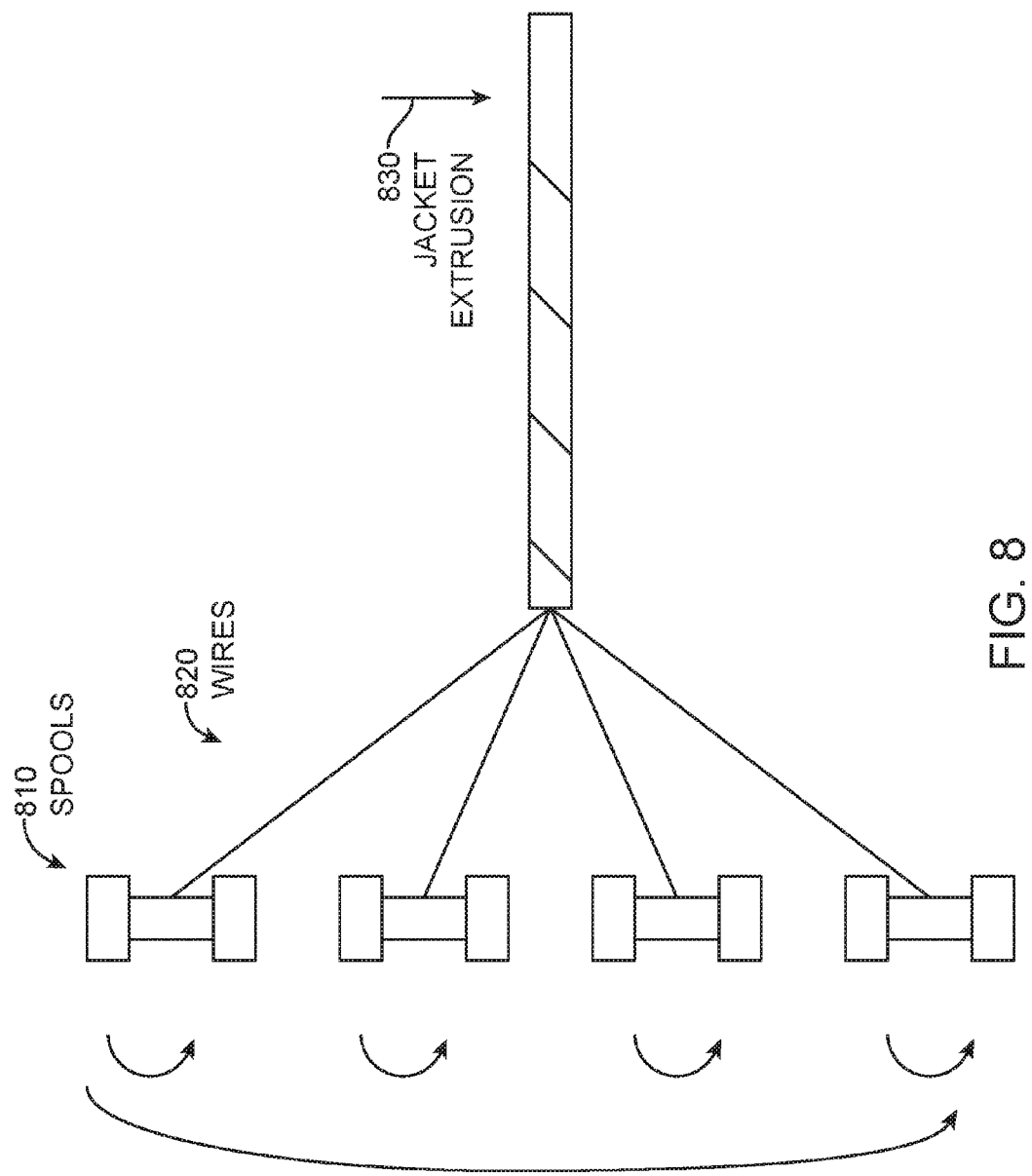
FIG. 8 illustrates the construction of a cable according to an embodiment of the present invention.

FIG. 8 illustrates the construction of a cable according to an embodiment of the present invention. In this example, a number of spools 810 may each hold one of the conductors 820. As the cable is formed, spools 810 may rotate, thereby individually twisting the wires. Also, spools 810 may twist as a group, thus twisting the wires as a group. For example, spools 810 may twist one-half turn, one turn, two turns, or other fractions or numbers of turns per length of cable. This combined twisting action may be referred to as planetary wire feeding, or as a planetary twist. In other embodiments of the present invention, other types of assembly may be used. For example, a back twist, or no twist, may be used. The various conductors may be bound together, for example using tape 825. A jacket may be extruded at 830, thus sealing the wires.

Spools 810 may hold various types of conductors or groups of conductors. For example, they may hold single conductors, coaxial cables, twisted pairs or shielded twisted pairs, or other types of conductors or groups of conductors. In a specific embodiment of the present invention, the conductors on one or more spools 810 are grouped in pairs, referred to as twinaxial, or twinax cables.

Again, cables according to embodiments of the present invention may include a number of twisted pairs 520 and single wires 530, as shown in FIG. 5. The wires may connect to a printed circuit board in a connector insert, such as printed circuit board 120 in FIG. 1. However, twisted pairs 520 may emerge from an end of the cable in any orientation. As such, it may be difficult to solder the twisted pairs 520 to printed circuit board 120. Accordingly, embodiments of the present invention may employ a wire comb to align the twisted pairs 520 in order to simplify soldering to printed circuit board 120. Use of such a comb may improve the manufacturability of connector inserts according to embodiments of the present invention. An example of such a wire comb is shown in the following figure.

Figure 9:
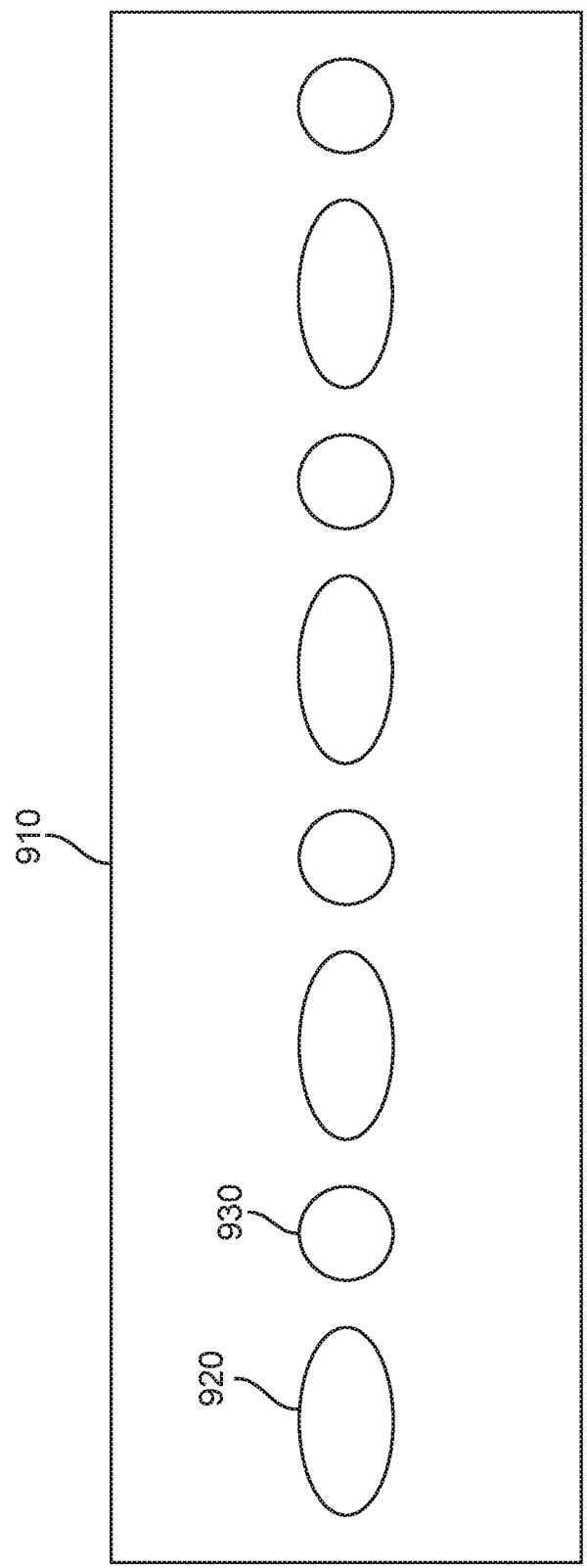
FIG. 9 illustrates a wire comb that may be used to align twisted-pairs emerging from a cable according to an embodiment of the present invention.

FIG. 9 illustrates a wire comb 910 that may be used to align twisted-pairs emerging from a cable according to an embodiment of the present invention. Wire comb 910 may include a plurality of non-circular openings 920 and circular openings 930. Twisted pairs 520 may be untwisted to the point where they fit in openings 920, then passed through openings 920. Single wires 530 may be passed through openings 930. In this way, connectors from a cable may be aligned as they emerge from wire comb 910. This allows the conductors to be soldered to printed circuit board 120, as shown in the following figure.

Figure 10:
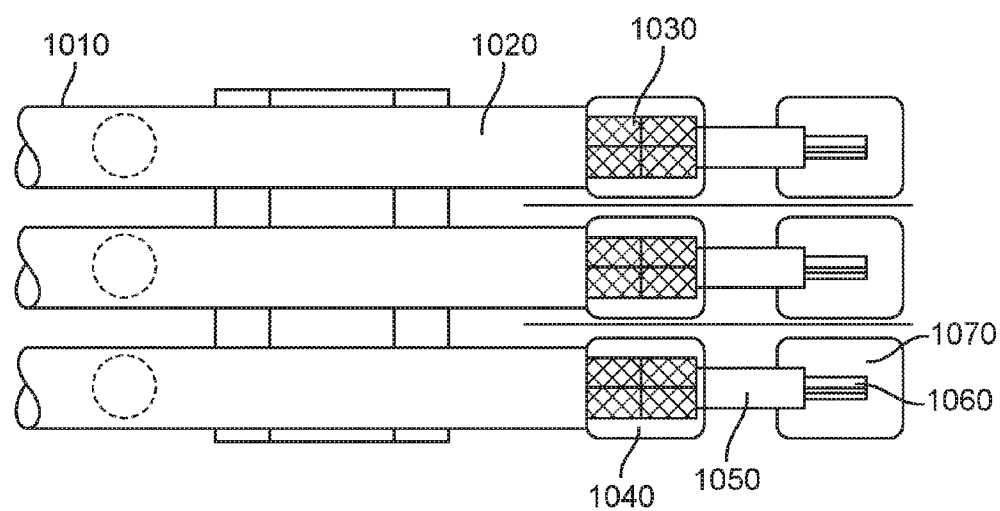
FIG. 10 illustrates a plurality of conductors that may be soldered to solder pads on a printed circuit board.

FIG. 10 illustrates a plurality of conductors 1010 that may be soldered to solder pads 1040 and 1070 on a printed circuit board, such as printed circuit board 120. Specifically, connectors 1010 are covered by jacket 1020. Jacket 1020 may be removed thereby exposing braiding or shield layers 1030. Shield layers 1030 may be soldered to pads 1040. An internal isolation layer 1050 may be stripped away leaving connector terminals 1060, which may be soldered to pads 1070.

Once conductors 1010 are aligned, it may be desirable to be able to solder shield layers 1030 to pads 1040 and connectors 1060 to pads 1070 in a reliable manner. Accordingly, embodiments of the present invention may employ a shaped solder bar during the soldering process. An example is shown in the following figure.

Figure 11:
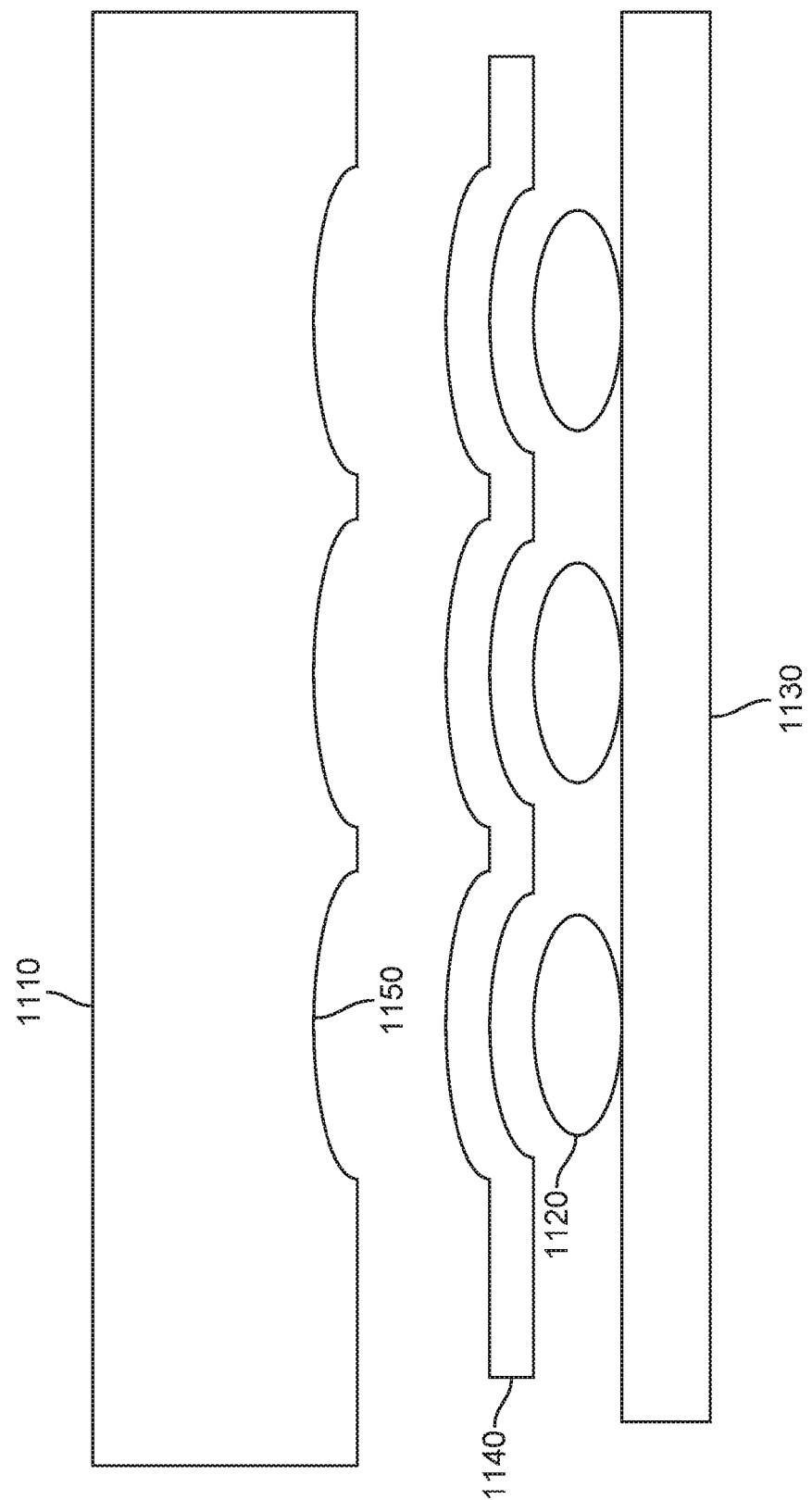
FIG. 11 illustrates a method of soldering conductors to a printed circuit board according to an embodiment of the present invention.

FIG. 11 illustrates a method of soldering conductors to a printed circuit board according to an embodiment of the present invention. In this example, twisted-pair conductors 1120 are to be soldered to pads on a printed circuit board 1130. A shaped solder bar 1140 may be placed over connectors 1120. Hot bar 1110 may be heated, for example by passing a current from one end to another. Hot bar 1110 may be lowered such that solder bar 1140 is heated and flows, thereby soldering a shield layer of twisted pair is 1120 to pads on printed circuit board 1130. In this example, hot bar 1110 may include recesses 1150 such that solder bar 1140 is evenly heated. This configuration may provide a reliable solder connection between a shield braid of twisted-pair 1120 and a pad on printed circuit board 1130.

FIG. 12 illustrates a connector insert according to an embodiment of the present invention. This connector insert includes an insert portion 1210 to fit in a compliant connector receptacle. Housing 1220 may be included such that a user can manipulate the connector insert. Stress relief and cable 1230 are also included for illustrative purposes.

FIG. 13 illustrates an exploded view of a connector insert according to an embodiment of the present invention. Conductors of cable 1305 pass through wire comb 1140 as described above. These conductors attach to printed circuit board 1350. One or more circuits 1355 may be located on printed circuit board 1350. Contacts 1365 may be supported by structure 1360, and attach to printed circuit board 1350. Frame portions 1310 and 1312 may encapsulate printed circuit board 1350 and active circuitry 1355. Housing portions 1332 and 1320 may form a housing around the connector insert. A dust shield 1370 may be provided to protect the connector insert during transport and shipment.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector insert and cable apparatus comprising:
an insert shield;
a cable comprising a plurality of twisted pairs, a plurality of wires, and a shield layer electrically connected to the insert shield;
a block having a plurality of non-circular openings for the twisted pairs and a plurality of approximately circular openings for the wires, wherein the plurality of twisted pairs and a plurality of wires pass through the block using the openings;
a printed circuit board coupled to at least one of the twisted pairs, the printed circuit board having a pad connected to the insert shield; and
an active device fixed to the printed circuit board and thermally coupled to the insert shield.

2. The connector insert and cable apparatus of claim 1 wherein the cable shield layer is soldered to the insert shield.

3. The connector insert and cable apparatus of claim 1 wherein each of the plurality of non-circular openings are approximately elliptical.

4. The connector insert and cable apparatus of claim 1 wherein the pad is located on a side of the printed circuit board.

5. The connector insert and cable apparatus of claim 1 wherein a cap is crimped over the connection between the shield layer and the insert shield.

6. The connector insert and cable apparatus of claim 5 wherein the cap is soldered to the connector insert.

7. The connector insert and cable apparatus of claim 1 further comprising: a plastic housing covering a portion of the insert shield.

8. The connector insert and cable apparatus of claim 1 wherein the cable shield layer comprises a plurality of fibers.

9. The connector insert and cable apparatus of claim 5 wherein the plurality of fibers comprises aramid fibers.

10. A connector insert and cable apparatus comprising:
a cable having a shield layer; and
a connector insert comprising:
a printed circuit board having a first side ground contact formed on a first side of the printed circuit board;
an integrated circuit on the printed circuit board; and
a shield around the printed circuit board,
wherein the integrated circuit is thermally connected to the shield,
wherein the first side ground contact on the printed circuit board is attached to the shield, and
wherein the shield layer is electrically connected to the shield.

11. The connector insert and cable apparatus of claim 10 wherein the printed circuit board further comprises a second ground contact on a second side, the second ground contact attached to the shield.

12. The connector insert and cable apparatus of claim 11 wherein the first side ground contact and the second side ground contact are soldered to the shield.

13. The connector insert and cable apparatus of claim 10 wherein the integrated circuit is thermally connected to the shield using a thermally conductive material.

14. The connector insert and cable apparatus of claim 10 further comprising a housing around at least a portion of the shield.

15. A connector insert and cable apparatus comprising:
a cable having a shield layer and a plurality of conductors; and
a connector insert comprising:
a printed circuit board having a first side ground contact formed on a first side of the printed circuit board;
an integrated circuit on the printed circuit board and coupled to the plurality of conductors;
a plurality of contacts;
a housing supporting the plurality of contacts and attached to the printed circuit board; and
a shield around the printed circuit board and electrically connected to the shield layer and the first side ground contact.

16. The connector insert and cable apparatus of claim 15 wherein the printed circuit board further comprises a second ground contact on a second side, the second ground contact attached to the shield.

17. The connector insert and cable apparatus of claim 16 wherein the first side ground contact and the second side ground contact are soldered to the shield.

18. The connector insert and cable apparatus of claim 15 further comprising a block having passages, each passage for one of the plurality of conductors.

19. The connector insert and cable apparatus of claim 15 wherein the integrated circuit is thermally connected to the shield using a thermally conductive material.

20. The connector insert and cable apparatus of claim 15 further comprising a housing around at least a portion of the shield.

* * * * *